United States Patent
Veerasamy et al.

(10) Patent No.: US 6,878,403 B2
(45) Date of Patent: Apr. 12, 2005

(54) METHOD OF ION BEAM TREATMENT OF DLC IN ORDER TO REDUCE CONTACT ANGLE

(75) Inventors: Vijayen S. Veerasamy, Ann Arbor, MI (US); Scott V. Thomsen, Milford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 94 days.

(21) Appl. No.: 10/264,317

(22) Filed: Oct. 4, 2002

(65) Prior Publication Data

US 2004/0067362 A1 Apr. 8, 2004

(51) Int. Cl.$^7$ .............................................. C23C 16/26
(52) U.S. Cl. .................................. 427/249.7; 427/553
(58) Field of Search ............................ 427/249.7, 533, 427/553

(56) References Cited

U.S. PATENT DOCUMENTS

| | | | |
|---|---|---|---|
| 3,682,528 A | 8/1972 | Apfel et al. | |
| 5,011,745 A | 4/1991 | Dietrich et al. | |
| 5,229,194 A | 7/1993 | Lingle et al. | |
| 5,543,203 A | 8/1996 | Tani et al. | |
| 5,965,629 A | 10/1999 | Jung et al. | |
| 6,183,843 B1 * | 2/2001 | Feng et al. | 428/212 |
| 6,303,225 B1 | 10/2001 | Veerasamy | |
| 6,303,226 B2 | 10/2001 | Veerasamy | |
| 6,359,388 B1 | 3/2002 | Petrmichl | |
| 6,368,664 B1 | 4/2002 | Veerasamy et al. | |
| 6,416,816 B2 | 7/2002 | Veerasamy et al. | |
| 6,475,573 B1 * | 11/2002 | Veerasamy et al. | 427/523 |
| 2001/0031382 A1 | 10/2001 | Kusakawa et al. | |
| 2001/0051273 A1 | 12/2001 | Veerasamy | |
| 2001/0053412 A1 | 12/2001 | Veerasamy et al. | |
| 2002/0045037 A1 | 4/2002 | Boire et al. | |
| 2002/0127404 A1 * | 9/2002 | Veerasamy | 428/408 |
| 2003/0118828 A1 * | 6/2003 | Briand et al. | 428/408 |

FOREIGN PATENT DOCUMENTS

| | | |
|---|---|---|
| WO | WO 01/66820 | 9/2001 |
| WO | WO 01/90016 | 11/2001 |
| WO | WO 02/04375 | 1/2002 |

OTHER PUBLICATIONS

"Role of Water and Oxygen in Wet and Dry Oxidation of Diamond", Larsson et al., Jul. 15, 2001, pp. 1026–1034.

* cited by examiner

Primary Examiner—Bret Chen
(74) Attorney, Agent, or Firm—Nixon & Vanderhye P.C.

(57) ABSTRACT

A method is provided for ion treating diamond-like carbon (DLC) in order to reduce contact angle thereof. For example, a substrate is coated with a layer(s) or coating(s) that includes, for example, amorphous carbon in a form of DLC. The DLC is then ion beam treated in a manner so as to cause the contact angle θ thereof to decrease. In certain example embodiments, at least oxygen gas is used in an ion beam source(s) that generates the ion beam(s) used for the ion beam treatment.

20 Claims, 6 Drawing Sheets

METHOD OF ION BEAM TREATMENT OF DLC IN ORDER TO REDUCE CONTACT ANGLE

Certain example embodiments of this invention relate to a hydrophilic coating including diamond-like carbon (DLC) provided on (directly or indirectly) a substrate of glass, plastic, or the like, and a method of making the same. More particularly, this invention relates to a DLC inclusive coating that is ion beam treated after its deposition in order to cause the coating to either become hydrophilic and/or to simply reduce its contact angle $\theta$.

BACKGROUND OF THE INVENTION

It is often desirable to provide a hydrophilic coating (e.g., anti-fog coating) on a substrate such as an automotive windshield, automotive window, automotive mirror, architectural mirror, bathroom mirror, architectural window, or the like. Such coatings may reduce the likelihood of water drops deposited on the substrate taking globular shape(s), thereby enabling visibility to be improved. In other words, hydrophilic coatings function to reduce bead-like condensation on substrate surfaces (e.g., on the interior surface of an automotive windshield or window). In essence, a hydrophilic coating can reduce the formation of many tiny droplets of liquid which can scatter light on a surface (i.e., make condensation on a surface film-wise as opposed to droplet-wise).

Unfortunately, certain hydrophilic coatings are not as durable and/or hard as would otherwise be desired and thus are not efficient from a practical point of view for applications such as automotive windshields and/or other types of windows or mirrors.

U.S. patent application Ser. No. 2002/0127404, hereby incorporated herein by reference, discloses a layer comprising diamond-like carbon (DLC) that is treated with ultraviolet (UV) radiation in order to cause it to become hydrophilic (i.e., the UV exposure causes the contact angle $\theta$ of the layer to decrease). While this process of making a hydrophilic DLC inclusive layer works well, it takes much time. The example in 2002/0127404 states that the DLC was treated with QUV for 86 hours in order to cause the contact angle $\theta$ of the DLC to drop from 73.47 degrees to 19.12 degrees (i.e., this contact angle reduction of 74% took 86 hours). It would be desirable if a DLC inclusive layer could be made to be hydrophilic via a less time-consuming process.

In view of the above, it is apparent that there exists a need in the art for (i) a coated article (e.g. coated glass or plastic substrate) having hydrophilic properties, and/or a method of making the same, (ii) a protective hydrophilic coating for window and/or mirror substrates that is somewhat resistant to scratching, damage, and/or (iii) a process for reducing a contact angle of DLC in a less time consuming manner.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a durable coated article that is less likely to attract or be affected by bead-like liquid condensation. Exemplary applications to which such hydrophilic coating(s) may be applied include, for example without limitation, automotive windshields, automotive backlites (i.e., rear vehicle windows), automotive side windows, architectural windows, mirrors, glass used for table furniture, etc.

Another object of certain embodiments of this invention is to ion beam treat a layer comprising DLC in order to cause its contact angle $\theta$ to drop/decrease. In certain embodiments, it has been found that ion beam treating a DLC inclusive layer (e.g., using oxygen and nitrogen gases, and/or water vapor gas, for example, in the ion source) oxidizes the surface of the DLC inclusive layer thereby causing its contact angle $\theta$ to quickly drop in a short period of time. In certain example embodiments, the ion beam treatment causes the contact angle $\theta$ of the DLC inclusive layer to drop at least about 20%, more preferably at least about 40%, even more preferably at least about 50%, and most preferably at least about 60%. The contact angle $\theta$ of the DLC inclusive layer before ion beam treatment may or may not be hydrophilic, but after said ion beam treatment in certain example embodiments the contact angle $\theta$ is less than about 25 degrees, more preferably less than about 20 degrees, even more preferably less than about 15 degrees, and most preferably less than about 10 degrees, and sometimes as low a 5 degrees or less.

Another object of this invention is to provide a scratch resistant hydrophilic coating.

Another object of certain example embodiments of this invention is to provide a coated article, wherein a layer of the coating includes both $sp^2$ and $sp^3$ carbon—carbon bonds and has a surface energy $Y_c$ of at least about 20 mN/m, more preferably at least about 24 mN/m, and most preferably at least about 26 mN/m.

Yet another object of this invention is to fulfill one or more of the above listed objects.

Certain example embodiments of the instant invention fulfill one or more of the above-listed objects by providing a method of making a coated article, the method comprising: depositing a layer comprising diamond-like carbon (DLC) on a substrate; and after said depositing, ion beam treating the layer comprising DLC to cause a contact angle $\theta$ of the layer comprising DLC to decrease by at least about 20%.

Certain other example embodiments of this invention fulfill one or more of the above-listed objects by providing a method of making a coated article, the method comprising: ion beam depositing a layer comprising diamond-like carbon (DLC) on a substrate; providing a gas comprising oxygen in at least one ion source; and ion beam treating the layer comprising DLC using at least the one ion source with the gas therein so as to cause a contact angle $\theta$ of the layer comprising DLC to decrease by at least about 20%.

Certain other example embodiments of this invention fulfill one or more of the above-listed objects by providing a coated article comprising: a layer comprising diamond-like carbon (DLC) supported by a substrate; and wherein an exterior surface of the layer comprising DLC is ion beam treated so as to be oxidized so that a contact angle $\theta$ of the layer comprising DLC is less than 15 degrees.

Certain other example embodiments of this invention fulfill one or more of the above-listed objects by providing a method of reducing a contact angle $\theta$ of a layer comprising diamond-like carbon (DLC), the method comprising using hydrogen peroxide ($H_2O_2$) in gas and/or liquid form to reduce the contact angle $\theta$ of the layer comprising DLC by at least about 20%.

Certain other example embodiments of this invention fulfill one or more of the above-listed objects by providing a method of reducing a contact angle $\theta$ of a layer comprising diamond-like carbon (DLC), the method comprising: using at least one ion source to direct ions comprising at least oxygen toward the layer comprising DLC in order to reduce the contact angle $\theta$ of the layer comprising DLC by at least about 20%.

This invention will now be described with respect to certain embodiments thereof, along with reference to the accompanying illustrations.

DETAILED DESCRIPTION OF CERTAIN EXAMPLE EMBODIMENTS OF THIS INVENTION

Referring now more particularly to the accompanying drawings in which like reference numerals indicate like elements throughout the accompanying views.

Certain example embodiments of this invention relate to improving hydrophilic qualities of a coated article (e.g., automotive windshield, automotive backlite, automotive side window, snow-mobile windshield, architectural window, mirror, coated glass for use in furniture, etc.) by providing a diamond-like carbon (DLC) inclusive layer or coating on a substrate in a manner such that the resulting article and/or layer has hydrophilic qualities or characteristics. Certain other embodiments of this invention relate to lowering the contact angle θ of a layer comprising DLC, regardless of whether or not the final contact angle ends up rendering the coated article hydrophilic.

Surprisingly, it has been found that the contact angle θ of a layer of or including DLC can be decreased by ion beam treating the DLC layer after it has been deposited. The ion beam(s) used for the treatment may be diffused, collimated, and/or focused, and one or more ion sources (and thus one or more beams) may be used for the ion beam treatment. In certain embodiments, both diffused and collimated beams may be used. It has been found that the ion beam treatment increases the polar component of the DLC inclusive layer's surface energy, which in turn increases the layer's total surface energy. The higher the surface energy, the more hydrophilic the layer and the lower the contact angle θ. Thus, by increasing the surface energy via the ion beam treatment, the hydrophilicity of DLC can be improved and thus the contact angle θ lowered.

In certain example embodiments, it has been found that ion beam treating a DLC inclusive layer (e.g., using oxygen and nitrogen gases, and/or water vapor gas, for example, in the ion source(s)) causes the surface of the DLC inclusive layer to at least partially oxidize thereby causing its contact angle θ to quickly drop in a short period of time (e.g., in seconds or minutes, as opposed to the tens of hours required in U.S. application Ser. No. 2002/0127404). In certain embodiments of this invention, a given piece of coated glass can have its contact angle reduced by any of the amounts herein in no more than one minute. In certain example embodiments, the ion beam treatment causes the contact angle θ of a DLC inclusive layer to drop at least about 20%, more preferably at least about 40%, even more preferably at least about 50%, and most preferably at least about 60%. The contact angle θ of a DLC inclusive layer before ion beam treatment may or may not be hydrophilic, but after said ion beam treatment in certain example embodiments the contact angle θ is less than about 25 degrees, more preferably less than about 20 degrees, even more preferably less than about 15 degrees, and most preferably less than about 10 degrees.

Combining the hydrophilicity with the use of an amorphous diamond-like carbon (DLC) layer/coating provided on the base substrate enables the resulting coated article to have a low contact angle θ as well as surface hardness and scratch resistant characteristics sufficient such that the article may be used in automotive and other high exposure environments where durability is desired. Optionally, polar inducing dopant(s) (e.g., B, N, P, As, S, Sb, Ga, In, and/or any other polar inducing dopant) may be provided in the DLC (in addition to the ion beam treatment) so as to help the DLC become more polar, which in turn increases surface energy and thus provides for a more hydrophilic coating. In certain optional embodiments, UV treatment may also be used in combination with the ion beam treatment to cause the contact angle θ of the DLC inclusive layer to decrease and/or stay low.

Figure 1:
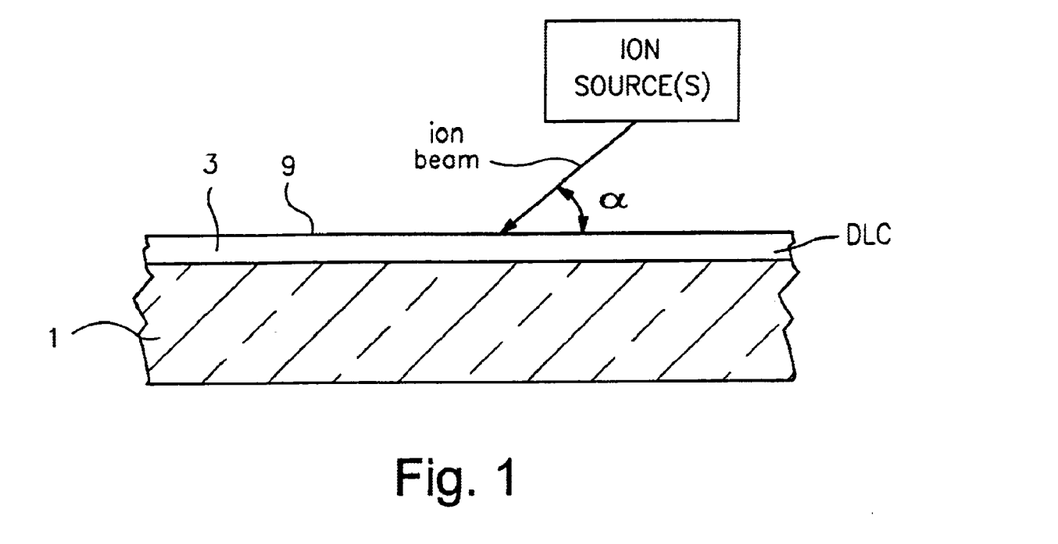
FIG. 1 is a side cross sectional view of a coated article according to an embodiment of this invention, wherein a substrate is provided with at least a layer of or including DLC thereon that is ion beam treated using one or more ion beam source(s) in order to cause the layer's contact angle θ to decrease.
Figure 2:
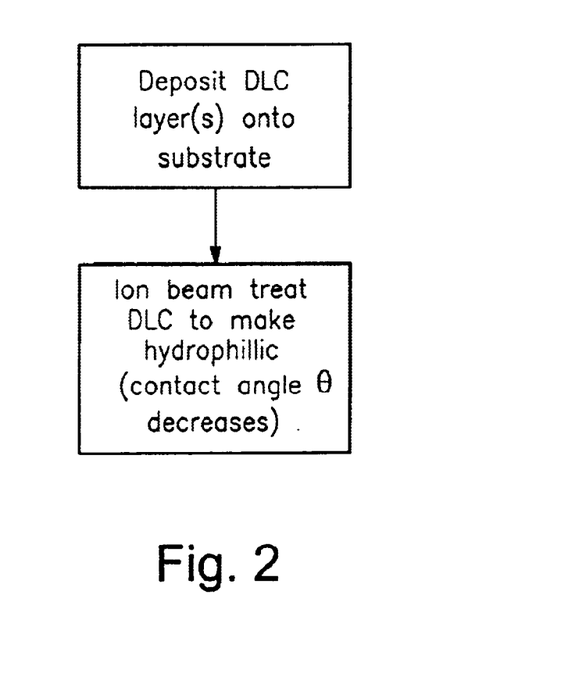
FIG. 2 is a general flowchart according to an example embodiment of this invention, illustrating that ion beam treatment can be used to cause the contact angle θ of a DLC inclusive layer to decrease.

FIG. 1 is a side cross-sectional view of a coated article according to an embodiment of this invention, wherein at least one diamond-like carbon (DLC) inclusive protective coating(s) or layer 3 is provided on substrate 1. The coated article has an exterior or outer surface 9. Substrate 1 may be of glass, plastic, ceramic, or the like. Optionally, other layer(s) (e.g., a dielectric layer(s) and/or a multi-layered low-E coating—not shown) may be provided between the DLC inclusive layer 3 and the substrate 1 in certain embodiments of this invention. FIG. 2 is a flowchart illustrating steps taken in order to reduce the contact angle θ of the DLC layer 3 in certain embodiments of this invention.

Referring to FIGS. 1–2, layer 3 comprising DLC may be ion beam deposited on substrate 1 (optionally, other layer(s) may be on the substrate under the DLC layer 3). The term "on" (with regard to a layer being "on" a substrate or other layer) herein means supported by, regardless of whether or not other layer(s) are provided therebetween. Thus, for example, DLC inclusive layer 3 may be provided directly on substrate 1 as shown in FIG. 1, or may be provided on substrate 1 with a low-E coating or other layer(s) therebetween. Exemplary layer systems (in fill or any portion of these coatings) that may be used as low-E or other coating(s) on substrate 1 between DLC layer 3 and the substrate are shown and/or described in any of U.S. Pat. Nos. 5,837,108, 5,800,933, 5,770,321, 5,557,462, 5,514,476, 5,425,861, 5,344,718, 5,376,455, 5,298,048, 5,242,560, 5,229,194, 5,188,887, 3,682,528, 5,011,745, WO 02/04375 (commonly owned U.S. Ser. No. 09/794,224) and 4,960,645, which are all hereby incorporated herein by reference. These optional coatings are provided for purposes of example and are not intended to be limiting.

As deposited, the layer 3 comprising DLC may be deposited as any of the DLC inclusive layer(s) in any of U.S. Pat. Nos. 6,303,226 and/or 6,303,225 (both hereby incorporated herein by reference), or in any other suitable manner/form. Thus, the layer 3 comprising DLC may have more $sp^3$ carbon—carbon bonds than $sp^2$ carbon—carbon bonds either throughout the entire layer and/or in at least one 10 angstrom thick portion thereof. Moreover, the DLC layer 3 is preferably entirely or at least partially amorphous and may or may not be hydrogenated in certain embodiments. For example, the DLC layer 3 may include from about 1–25% H in certain embodiments, more preferably from about 5–20% H, and most preferably from about 7–18% H in certain embodiments of this invention. In certain embodiments, DLC layer 3 may be from about 10 to 1,000 Angstroms thick, more preferably from about 50 to 250 Angstroms thick. Moreover, in certain exemplary embodiments of this invention, layer 3 has an average hardness of at least about 10 GPa, more preferably of at least about 20 GPa, and even more preferably of at least about 50 GPa. Also, the DLC layer 3 may have an average density of at least about 2.4 grams/cm$^2$ (more preferably from about 2.5 to 3.0 grams/cm$^2$) in certain example embodiments of this invention.

As shown in FIGS. 1–2, the outer surface 9 of the DLC inclusive layer 3 is ion beam treated using at least one ion source (and thus at least one ion beam) in order to cause the contact angle θ of the layer 3 to decrease. When oxygen and nitrogen gas are used in the ion beam source(s) for example, the ion beam treatment of the surface 9 of the coated article causes the outer surface of the layer 3 to at least partially oxidize thereby causing the contact angle to quickly drop (optionally, oxygen with no nitrogen may instead be used as a gas). The use of oxygen gas (optionally with N, H, and/or other gas) causes the resulting ion beam(s) that is directed toward surface 9 to include $O_2^-$, $O^-$ and/or $OH^-$ ions (ions including at least oxygen). One or more of these ions hit the surface 9 of the DLC inclusive layer 3 and cause its contact angle θ to drop (presumably because C=O—H, C=O, and/or C—O bonds (i.e., oxygen—carbon bonds and/or oxygen—hydrogen—carbon bonds) form at the surface 9 of the DLC inclusive layer 3 thereby causing its surface energy to rise). In other words, the ion beam treatment introduces oxygen to the surface 9 of the DLC inclusive layer 3, which is believed to be a primary reason why the contact angle is caused to quickly drop.

By tuning the gas composition, ion energy, and throw distance in the beam(s), one may be able to run such a treating process at speeds of 100 in./minute or more, and still achieve hydrophilic surface(s). Oxygen is a preferred example gas to be used in a treating ion beam source(s), although other gases may be used instead of or in addition to oxygen in different embodiments of this invention so long as they cause the contact angle to decrease. When N is used in a gas in one or more of the ion beam source(s) for the ion beam treatment (e.g., in combination with oxygen and/or hydrogen gas), the resulting N ions tend to make the surface of DLC layer 3 more electrically conductive than the glass which may be desirable in some instances. In other embodiments, water vapor may be used as a feed gas in at least one of the ion beam treating source(s). Resulting ions can end up being subimplanted in the surface of layer 3, and the polar nature of these ions/molecules when water vapor gas is used can significantly reduce the static potential which can attract dust particles thereby enabling the coating to be more resistant to dust accumulation. In still other embodiments, the ion treatment may use $H_2O_2$ gas in at least one of the ion beam sources used for the treating. Again, the $O_2^-$, $O^-$ and/or $OH^-$ ions hit the surface 9 of the DLC inclusive layer 3 and cause contact angle θ to drop as discussed above. Other gases may also be used in other embodiments of this invention. It is noted that the ion beam treatment, while causing the contact angle of layer 3 to decrease, may cause some portion (e.g., 0–20 angstroms) of the layer 3 to be removed during the ion beam treatment process.

As discussed above, the ion beam treatment of the surface of DLC inclusive layer 3 may cause bonds in the DLC inclusive layer to become more polar, which in turn causes a higher surface energy and lower contact angle θ. In certain example instances, the ion beam treatment may cause more graphitic or polar $sp^2$ type bonds (e.g., C—C $Sp^2$ type bonds, C—N $sp^2$ type bonds, and/or the like) to be formed proximate the surface of layer 3 (note: many $sp^3$ type C—C bonds remain in the layer, with the bulk of the layer not being significantly effected). When more bonds at the surface of layer 3 become polar, this results in water being more attracted to the layer 3. The tetrahedral amorphous $sp^3$ type C—C bonds (ta—C) provide the layer 3 with acceptable hardness and/or scratch resistance characteristics while the $sp^2$ type bonds improve the layer's hydrophilicity and cause contact angle θ to drop. Preferably, a substantial portion of the carbon in layer 3 is in amorphous or disordered form (as opposed to crystalline form for example).

The angle α at which the ion beam(s) hits the surface 9 of DLC inclusive layer 3 during the ion beam treatment may be from about 1–90 degrees in different embodiments of this invention. However, in certain embodiments, the angle α that the beam(s) makes with the surface 9 of the coated article may be from about 30–60 degrees, most preferably from about 40–50 degrees.

Figure 3:
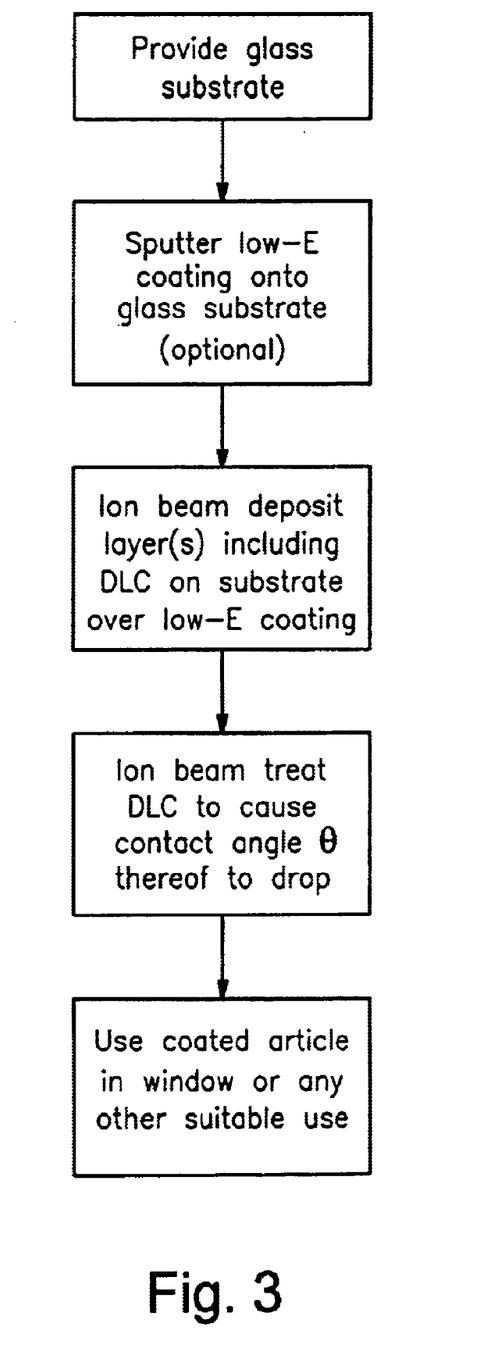
FIG. 3 is a more detailed flowchart according to an example embodiment of this invention, illustrating ion beam treatment used for causing the contact angle θ of a DLC inclusive layer to decrease.

FIG. 3 is a flowchart illustrating how a coated article is made according to another example embodiment of this invention. A glass substrate is provided, and an optional low-E coating (e.g., see example low-E coatings discussed above) including at least one infrared (IR) reflective layer (e.g., of or including Ag) sandwiched between at least a pair of dielectric layers is sputtered onto the glass substrate. After sputtering of the low-E coating, a layer comprising DLC 3 is ion beam deposited on the substrate over the low-E coating. The DLC layer 3 is then ion beam treated as discussed above in order to reduce its contact angle θ. In certain embodiments, the contact angle of the layer 3 may be reduced enough by the ion beam treatment to cause the coated article to be hydrophilic in nature. The resulting hydrophilic coated article may be useful applications such as vehicle windows, mirrors, architectural windows, IG window units, etc.

In certain example embodiments (e.g., see FIGS. 1–3), the coated article including the ion beam treated DLC inclusive layer 3 and/or the coating system on substrate 1 may be at least about 70% transparent to or transmissive of visible light rays, more preferably at least about 75%. When substrate 1 is of glass, the glass may be from about 1.5 to 5.0 mm thick. Conventional soda lime silica glass may be used as substrate 1 in certain embodiments, such glass being commercially available from Guardian Industries, Corp., Auburn Hills, Mich. In certain other embodiments of this invention, substrate 1 may be of borosilicate glass, or of substantially transparent plastic.

Figure 4:
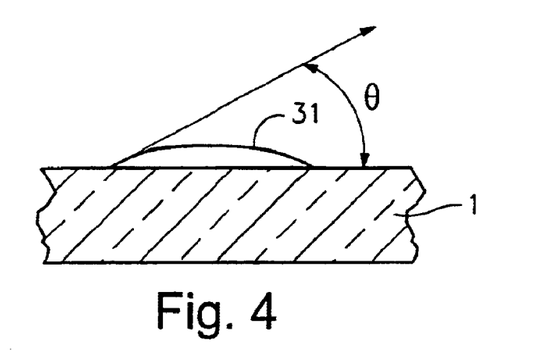
FIG. 4 is a side cross sectional partially schematic view illustrating a contact angle θ of a drop (e.g., sessile drop of water) on an uncoated glass substrate.
Figure 5:
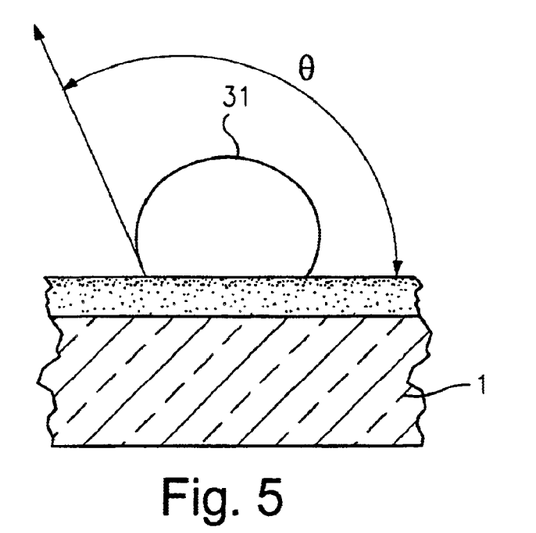
FIG. 5 is a side cross sectional partially schematic view illustrating a high contact angle θ of a drop on a coated article including a hydrophobic coating of, for example, an article disclosed in commonly owned U.S. patent application Ser. No. 09/442,805.
Figure 6:
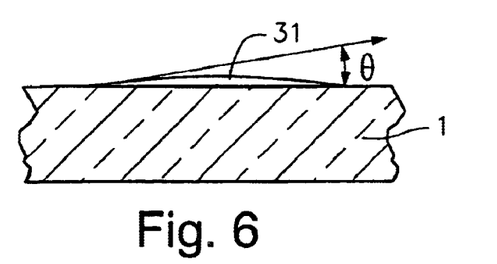
FIG. 6 is a side cross sectional partially schematic view illustrating a low contact angle θ of a drop (e.g., sessile drop of water) on a coated article according to an embodiment of this invention (following ion beam treatment for example).

Hydrophilic performance of coating/layer 3 in any of the above embodiments is a function of contact angle θ, surface energy Y, and/or wettability or adhesion energy W. The surface energy Y of layer 3 may be calculated by measuring its contact angle θ. Exemplary contact angles θ are illustrated in FIGS. 4–6. A hydrophilic coating or layer system 3 according to an embodiment of this invention is on the substrate of FIG. 6, while no coating of any kind is on the substrate of FIG. 4 and a hydrophobic coating (high contact angle) is on the substrate of FIG. 5. No coatings are illustrated in FIGS. 4 and 6 for purposes of simplicity. To measure contact angle θ in an example embodiment, a sessile drop 31 of a liquid such as water is placed on the substrate (which may be coated) as shown in FIGS. 4–6. A contact angle θ between the drop 31 and underlying article appears, defining an angle θ depending upon the interface tension between the three phases at the point of contact. The contact angle θ is greater in FIG. 5 than in FIG. 4, because the coating layer on the substrate in FIG. 5 is hydrophobic (i.e., results in a higher contact angle). However, in certain embodiments of this invention, the contact angle θ in FIG. 6 is low due to the ion beam treatment of the DLC inclusive layer 3 that is on the substrate 1 but it not shown in FIG. 6 for purposes of simplicity.

Generally, the surface energy $Y_c$ of a layer 3 or any other article/layer can be determined by the addition of a polar and a dispersive component, as follows: $Y_c=Y_{CP}+Y_{CD}$, where $Y_{CP}$ is the layer's/coating's polar component and $Y_{CD}$ the layer's/coating's dispersive component. The polar component of the surface energy represents the interactions of the surface mainly based on dipoles, while the dispersive component represents, for example, van der Waals forces, based upon electronic interactions. Generally speaking, the higher the surface energy $Y_c$ of layer 3, the more hydrophilic the layer (and coated article) and the lower the contact angle θ. Adhesion energy (or wettability) W can be understood as an interaction between polar with polar, and dispersive with dispersive forces, between the exterior surface 9 of the coated article and a liquid thereon such as water. For a detailed explanation, see U.S. 2002/0127404 (incorporated herein by reference). In certain example embodiments of this invention, after ion beam treatment of the DLC inclusive layer 3, the surface energy $Y_C$ of layer 3 may be at least about 20 mN/m, more preferably at least about 24 mN/m, and most preferably at least about 26 mN/m.

Figure 7:
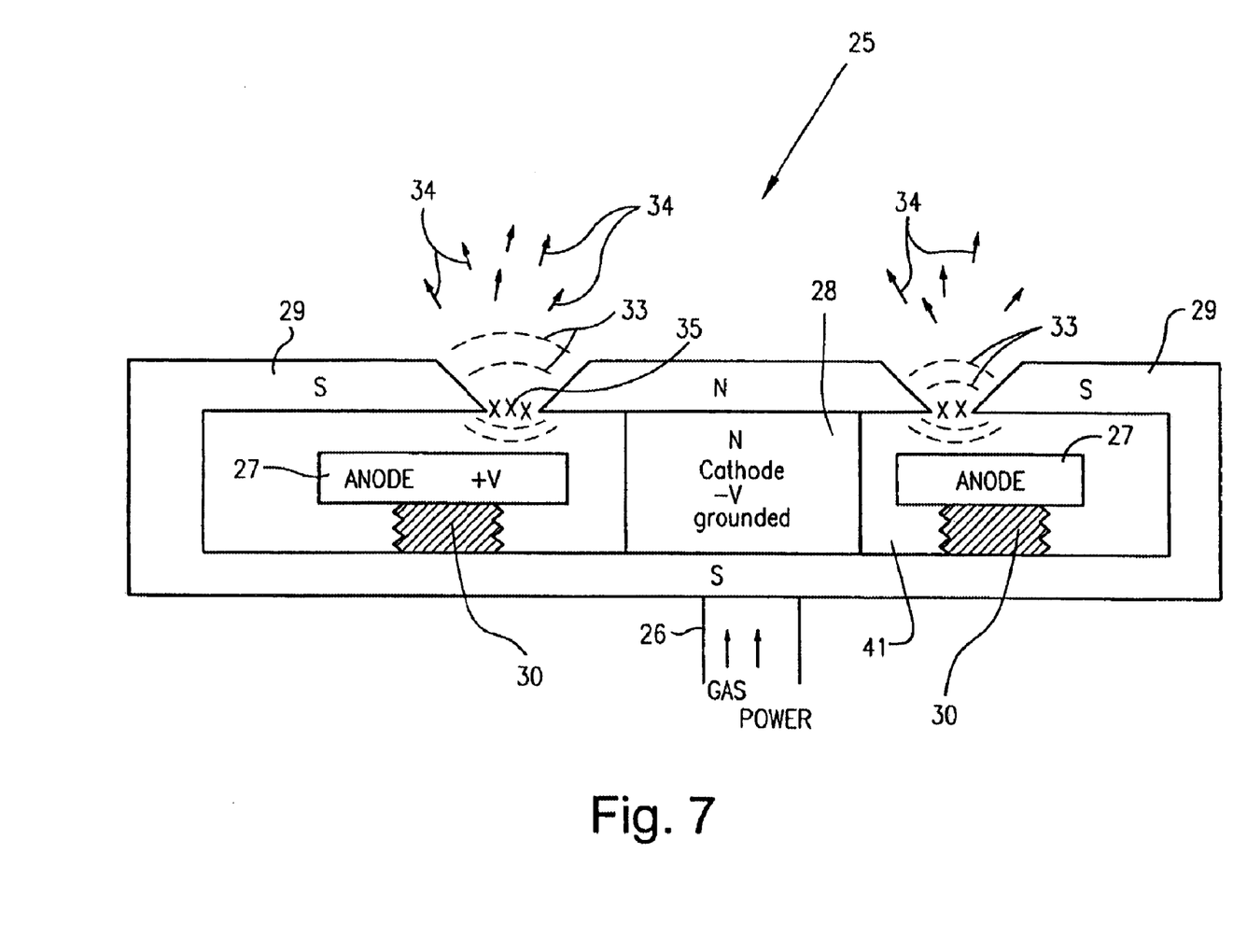
FIG. 7 is a side cross sectional view of an example linear ion beam source which may be used in any embodiment of this invention for depositing a DLC inclusive layer(s) and/or for ion beam treating a layer of or including DLC in order to cause its contact angle θ to decrease.
Figure 8:
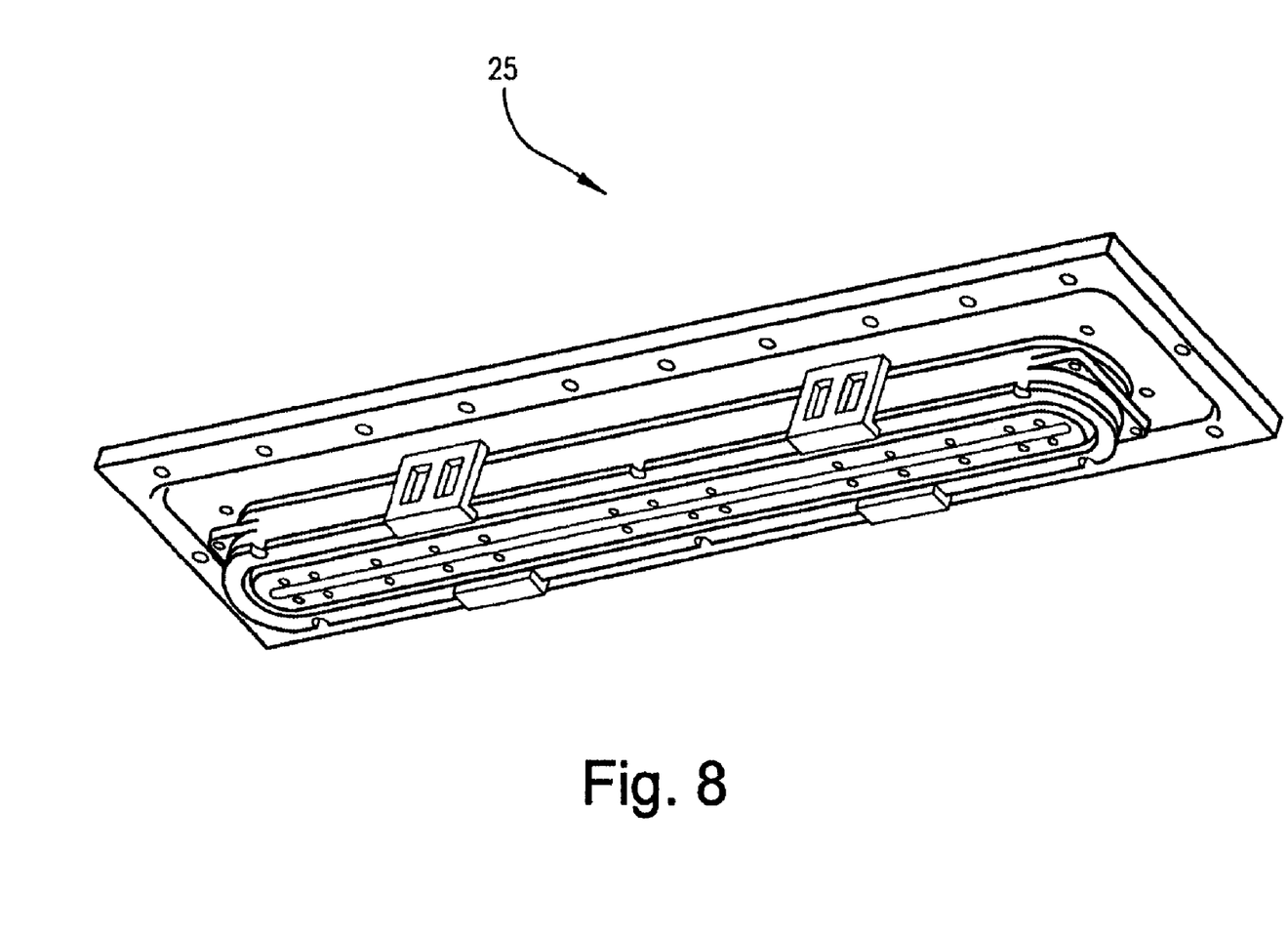
FIG. 8 is a perspective view of the linear ion beam source of FIG. 7.

FIGS. 7–8 illustrate an exemplary linear or direct ion beam source 25 which may be used to deposit layer(s) 3, clean a substrate 1, and/or ion beam treat the surface 9 of DLC inclusive layer 3 to reduce its contact angle θ. Ion beam source (or ion source) 25 includes gas/power inlet 26, racetrack-shaped anode 27, grounded cathode magnet portion 28, magnet poles 29, and insulators 30. A 3 kV DC power supply may be used for source 25 in some embodiments. The oxygen and/or other gas(es) discussed herein for use in the ion source during the ion beam treatment may be introduced into the source via gas inlet 26, or via any other suitable location. Linear source ion deposition allows for substantially uniform deposition of DLC inclusive layer 3 as to thickness and stoichiometry. Ion beam source 25 is based upon a known gridless ion source design. The linear source may include a linear shell (which is the cathode and grounded) inside of which lies a concentric anode (which is at a positive potential). This geometry of cathode-anode and magnetic field 33 may give rise to a close drift condition.

Feedstock gases (e.g., oxygen used in ion beam treating surface 9 to make contact angle drop, or $C_2H_2$ used for DLC deposition) may be fed through the cavity 41 between the anode and cathode. The electrical energy then cracks the gas to produce a plasma within the source. The ions 34 are expelled out and directed toward the substrate 1 in the form of an ion beam. The ion beam may be diffused, collimated, or focused. Example ions 34 are shown in FIG. 7. A linear source as long as 0.5 to 4 meters may be made and used in certain example instances, although sources of different lengths are anticipated in different embodiments of this invention. Electron layer 35 is shown in FIG. 7 and completes the circuit thereby enabling the ion beam source to function properly. Example but non-limiting ion beam sources that may be used to deposit layer 3 and/or to ion beam treat the same to cause its contact angle to drop are disclosed in U.S. Pat. Nos. 6,303,226, 6,359,388, 6,037,717, and 5,656,891, all of which are hereby incorporated herein by reference.

For purposes of example only, DLC inclusive layer 3 may be ion beam deposited on substrate 1 using source 25 of FIGS. 7–8 in a manner(s) described in any of U.S. Pat. Nos. 6,303,225, 6,303,226, 6,368,664, and/or 6,359,388, all of which are incorporated herein by reference. A hydrocarbon feedstock gas such as $C_2H_2$ may be used in the source in order to ion beam deposit the DLC inclusive layer 3. When it is desired to hydrogenate layer 3, for example, a dopant gas may be produced by bubbling a carrier gas (e.g. $C_2H_2$) through a precursor monomer (e.g. TMS or 3MS) held at about 70 degrees C. (well below the flashing point). Acetylene feedstock gas ($C_2H_2$) is used in certain embodiments to prevent or minimize/reduce polymerization and to obtain an appropriate energy to allow the carbon and/or hydrogen ions to penetrate the article and subimplant therein, thereby causing the layer 3 to grow. Other suitable gases, including polar inducing dopant gases, may also be used in the source to create the ions 34.

After the DLC inclusive layer 3 has been deposited (via ion beam deposition or any other suitable technique), its surface is ion beam treated as discussed above in order to decrease its contact angle. It is believed that the ion beam treatment results in oxidation and causes a thin carbon-oxide layer/portion to form at the surface of the layer 3 (e.g., including C=O and/or O—C=O bonds, discussed above for example). This thin at least partially oxidized surface layer portion has a fair amount of attraction to water molecules (polar bonds), thus explaining its hydrophilicity. This thin carbon oxide inclusive layer/portion may be from about 1–30 Å thick, more likely/preferably about 5–15 Å thick. This thin carbon oxide portion is believed to seal off the remainder of the layer 3 from the ambient atmosphere, so as to prevent further oxidation (i.e., the bulk of the hard $sp^3$ carbon—carbon bonds in the bulk of the layer 3 are thus resistant to oxidation so that the layer maintains its scratch resistance and the like). This sealing off prevents degradation of the bulk of layer 3, while at the same time providing hydrophilic properties (i.e., low contact angle) at the surface thereof.

EXAMPLE

The following hypothetical Example is for purposes of example only, and is not limiting. On a 2 mm thick clear glass substrate, a DLC layer 3 was ion beam deposited to a thickness of 14.69 angstroms (Å) using acetylene ($C_2H_2$) feedstock gas (145 sccm) at a linear velocity of 100 inches/minute, at 2970 V and 0.57 amps. The layer 3 was not doped with any of the dopants B, N, etc. The result was a DLC layer 3 of a-taC:H, having an initial contact angle θ of 73.47 degrees. Then, the coated article was then ion beam treated using a gas including a mixture of oxygen and nitrogen in the ion source. The ion beam for the treatment hit the surface 9 of layer 3 at an angle α of about 45 degrees. An energy of from 100–3,000 eV (e.g., 1,500 eV) was used. Following the ion beam treatment of surface 9, the coated article including substrate 1 with DLC layer 3 thereon had a contact angle θ which had dropped all the way down to 9 degrees. Thus, it can be seen that the contact angle decreased by about 88% due to the ion beam treatment of the DLC (i.e., 73.47−9= 64.47; and 64.47/73.47=0.877 or about 88%). Thus, in this particular example the DLC layer 3 as deposited was not hydrophilic, but after the ion beam treatment the contact angle θ of the article had dropped down into the hydrophilic range (i.e., less than 20 degrees).

Figure 9:
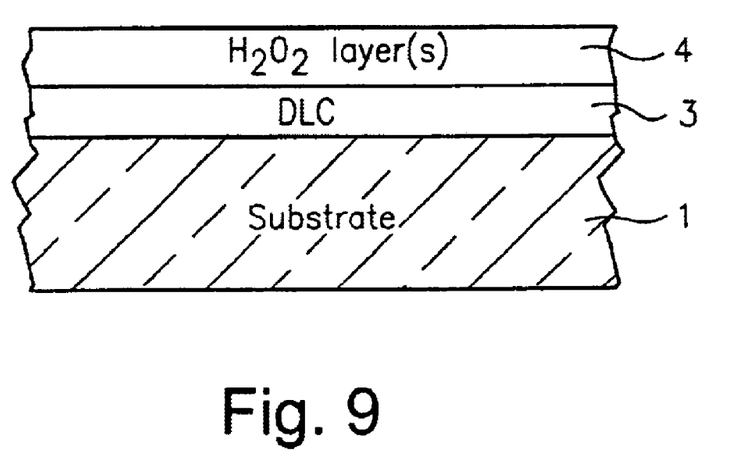
FIG. 9 is a cross sectional view of another embodiment of this invention, where a layer of or including $H_2O_2$ is formed over a DLC inclusive layer (that may or may not be ion beam treated in different instances) in order to provide a hydrophilic coated article.

FIG. 9 illustrates another embodiment of this invention, which may or may not be used in combination with the ion beam treatments of the above embodiments. In this embodiment, at least one layer 4 comprising hydrogen peroxide ($H_2O_2$) is formed on the substrate over the DLC inclusive layer 3. Layer 4 may be in the form of a liquid in certain embodiments of this invention. The hydrogen peroxide functions to clean the outer surface of the DLC, and in the process of doing so introduces OH⁻ radicals to the DLC surface. These radicals are chemisorbed at the DLC surface and cause contact angle to decrease due to the resulting polar component. This hydrogen peroxide ($H_2O_2$) may be introduced either in the form of a liquid, and/or via an ion beam as discussed above. Resulting contact angles of the coated article may be the same as those discussed above with respect to any of the aforesaid ion beam treatment embodiments.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A method of making a coated article, the method comprising:
    depositing a layer comprising diamond-like carbon (DLC) on a substrate; and
    after said depositing, ion beam treating the layer comprising DLC to cause a contact angle θ of the layer comprising DLC to decrease by at least about 20%.

2. The method of claim 1, wherein said ion beam treating causes the contact angle θ of the layer comprising DLC to decrease by at least about 40%, and wherein the layer comprising DLC has an average hardness of at least 10 GPa.

3. The method of claim 1, wherein said ion beam treating causes the contact angle θ of the layer comprising DLC to decrease by at least about 50%.

4. The method of claim 1, wherein said ion beam treating causes the contact angle θ of the layer comprising DLC to decrease by at least about 60%.

5. The method of claim 1, wherein after said ion beam treating, the layer comprising DLC has a contact angle θ of less than or equal to 20 degrees.

6. The method of claim 1, wherein after said ion beam treating, the layer comprising DLC has a contact angle θ of less than or equal to 15 degrees.

7. The method of claim 1, wherein after said ion beam treating, the layer comprising DLC has a contact angle θ of less than or equal to 10 degrees.

8. The method of claim 1, wherein the layer comprising DLC has an average hardness of at least 10 GPa.

9. The method of claim 1, wherein the layer comprising DLC is amorphous.

10. The method of claim 1, wherein the layer comprising DLC is hydrogenated.

11. The method of claim 1, wherein the layer comprising DLC has more $sp^3$ carbon—carbon bonds than $sp^2$ carbon—carbon bonds, and has an average density of at least about 2.4 grams/cm³.

12. The method of claim 1, wherein said ion beam treating comprises using at least one ion beam source that generates at least one ion beam toward a surface of the layer comprising DLC, and wherein at least oxygen gas is present in the ion beam source during the ion beam treating.

13. The method of claim 1, further comprising sputtering a low-E coating onto the substrate before depositing the layer comprising DLC, so that the low-E coating is located between the layer comprising DLC and the substrate, and wherein the substrate is a glass substrate.

14. A method of making a coated article, the method comprising:
    ion beam depositing a layer comprising diamond-like carbon (DLC) on a substrate;
    providing a gas comprising oxygen in at least one ion source; and
    ion beam treating the layer comprising DLC using at least the one ion source with the gas therein so as to cause a contact angle θ of the layer comprising DLC to decrease by at least about 20%.

15. The method of claim 14, wherein said ion beam treating causes the contact angle θ of the layer comprising DLC to decrease by at least about 40%, and wherein the layer comprising DLC has an average hardness of at least 10 GPa.

16. The method of claim 14, wherein said ion beam treating causes the contact angle θ of the layer comprising DLC to decrease by at least about 50%.

17. A method of reducing a contact angle θ of a layer comprising diamond-like carbon (DLC), the method comprising:
    using at least one ion source to direct ions comprising at least oxygen toward the layer comprising DLC in order to reduce the contact angle θ of the layer comprising DLC by at least about 20%.

18. A method of reducing a contact angle θ of a layer comprising diamond-like carbon (DLC), the method comprising using hydrogen peroxide ($H_2O_2$) in gas and/or liquid form to reduce the contact angle θ of the layer comprising DLC by at least about 20%.

19. The method of claim 18, wherein $H_2O_2$ gas is introduced into an ion source, and the layer comprising DLC is ion beam treated using the ion source in order to reduce the contact angle θ of the layer comprising DLC by at least about 20%.

20. The method of claim 18, wherein a liquid comprising $H_2O_2$ is applied to a surface of the layer comprising DLC in order to reduce the contact angle θ of the layer comprising DLC by at least about 20%.

* * * * *